(12) United States Patent
Krolak et al.

(10) Patent No.: US 10,020,759 B2
(45) Date of Patent: Jul. 10, 2018

(54) PARALLEL MODULAR CONVERTER ARCHITECTURE FOR EFFICIENT GROUND ELECTRIC VEHICLES

(71) Applicant: THE BOEING COMPANY, Chicago, IL (US)

(72) Inventors: Matthew J. Krolak, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/818,024

(22) Filed: Aug. 4, 2015

(65) Prior Publication Data
US 2017/0040915 A1    Feb. 9, 2017

(51) Int. Cl.
*B60W 10/26* (2006.01)
*H02P 5/74* (2006.01)
(Continued)

(52) U.S. Cl.
CPC ............ *H02P 5/74* (2013.01); *B60K 1/02* (2013.01); *B60L 3/0076* (2013.01); *B60L 11/1803* (2013.01); *B60L 15/007* (2013.01); *B60L 15/2009* (2013.01); *B60L 15/38* (2013.01); *H02M 7/44* (2013.01); *H02M 7/493* (2013.01); *H02P 27/08* (2013.01); *B60L 2210/40* (2013.01); *B60L 2220/46* (2013.01); *B60L 2260/28* (2013.01); *H02M 2001/008* (2013.01); *Y02T 10/642* (2013.01); *Y02T 10/7005* (2013.01); *Y02T 10/7241* (2013.01); *Y02T 10/7275* (2013.01)

(58) Field of Classification Search
CPC .............................. B60W 10/08; B60W 10/24
See application file for complete search history.

(56) References Cited

U.S. PATENT DOCUMENTS 3,254,302 A    5/1966    Boykin et al.
3,675,114 A    7/1972    Nercessian
(Continued)

FOREIGN PATENT DOCUMENTS

EP    0409226 A2    1/1991
EP    3409226 A2    1/1991
(Continued)

OTHER PUBLICATIONS

U.S. Appl. No. 14/502,350, entitled Parallel Modular Converter Architecture, filed Sep. 30, 2014.
(Continued)

*Primary Examiner* — Jeffrey J Restifo
(74) *Attorney, Agent, or Firm* — Patterson + Sheridan, LLP

(57) ABSTRACT

Method and apparatus for powering electric motors. The electric motors are connected to a DC power supply by a parallel modular converter that includes a plurality of parallel power converters that convert the DC power to AC power. The parallel modular converter selectively connects different parallel power converters to different ones of the electric motors to provide an adequate supply of electrical power to meet the load conditions of the electric motor. As the load conditions of the electric motors dynamically change, the parallel modular converter can selectively connect certain PPCs to different motors to satisfy the changing load conditions.

20 Claims, 6 Drawing Sheets

(51) Int. Cl.
  *H02P 27/08*   (2006.01)
  *B60K 1/02*    (2006.01)
  *B60L 3/00*    (2006.01)
  *B60L 11/18*   (2006.01)
  *H02M 7/44*    (2006.01)
  *H02M 7/493*   (2007.01)
  *B60L 15/00*   (2006.01)
  *B60L 15/20*   (2006.01)
  *B60L 15/38*   (2006.01)
  *H02M 1/00*    (2006.01)

(56) References Cited

U.S. PATENT DOCUMENTS

| | | | |
|---|---|---|---|
| 4,461,690 A | 7/1984 | Rolff et al. | |
| 4,616,142 A | 10/1986 | Upadhyay et al. | |
| 4,717,833 A | 1/1988 | Small | |
| 4,877,972 A | 10/1989 | Sobhani et al. | |
| 5,208,485 A | 5/1993 | Krinsky et al. | |
| 5,434,527 A | 7/1995 | Antone | |
| 5,592,394 A | 1/1997 | Wiscombe | |
| 5,889,663 A | 3/1999 | Tabata et al. | |
| 5,939,802 A | 8/1999 | Hornbeck | |
| 6,147,886 A | 11/2000 | Wittenbreder | |
| 6,272,023 B1 | 8/2001 | Wittenbreder | |
| 6,278,263 B1 | 8/2001 | Walters et al. | |
| 6,534,960 B1 | 3/2003 | Wells et al. | |
| 6,806,772 B2 | 10/2004 | Glaser et al. | |
| 6,901,520 B2 | 5/2005 | Odaohhara et al. | |
| 7,265,601 B2 | 9/2007 | Ahmad | |
| 7,423,894 B2 | 9/2008 | Ilic | |
| 7,465,507 B2 | 12/2008 | DeVries | |
| 7,521,985 B2 | 4/2009 | Ball et al. | |
| 7,579,900 B2 | 8/2009 | Durbaum | |
| 7,745,025 B2 | 6/2010 | Leach et al. | |
| 7,847,432 B2 | 12/2010 | Ichikawa | |
| 8,125,200 B2 | 2/2012 | Tsai et al. | |
| 8,373,304 B2 | 2/2013 | Chang et al. | |
| 8,432,104 B2 | 4/2013 | Hu et al. | |
| 8,604,841 B2 | 12/2013 | Lobsiger et al. | |
| 8,736,102 B1 | 5/2014 | Gao et al. | |
| 8,964,432 B2 | 2/2015 | Tang et al. | |
| 8,972,765 B1* | 3/2015 | Krolak | H02J 7/0018 320/149 |
| 9,046,912 B1 | 6/2015 | Liu et al. | |
| 9,048,726 B1 | 6/2015 | Tang et al. | |
| 9,647,455 B2 | 5/2017 | Gao et al. | |
| 2003/0214354 A1 | 11/2003 | Chen et al. | |
| 2004/0138786 A1 | 7/2004 | Blackett et al. | |
| 2007/0160259 A1 | 7/2007 | Huang | |
| 2007/0200538 A1 | 8/2007 | Tang et al. | |
| 2007/0221267 A1 | 9/2007 | Fornage | |
| 2007/0259545 A1 | 11/2007 | Berenger | |
| 2008/0011528 A1* | 1/2008 | Verbrugge | B60K 6/28 180/65.29 |
| 2008/0100136 A1 | 5/2008 | Langlois et al. | |
| 2008/0111421 A1 | 5/2008 | Anghel et al. | |
| 2009/0156068 A1 | 6/2009 | Barrett et al. | |
| 2009/0160259 A1 | 6/2009 | Naiknaware et al. | |
| 2009/0206804 A1 | 8/2009 | Xu et al. | |
| 2009/0322503 A1* | 12/2009 | Suzuki | B60W 50/14 340/438 |
| 2010/0013419 A1 | 1/2010 | White | |
| 2010/0049414 A1* | 2/2010 | Ohtomo | B60L 3/08 701/70 |
| 2010/0100264 A1* | 4/2010 | Kato | B60K 6/445 701/22 |
| 2010/0145589 A1* | 6/2010 | Kobayashi | B60K 6/46 701/93 |
| 2010/0156333 A1* | 6/2010 | Chen | H02P 21/18 318/400.33 |
| 2011/0025369 A1* | 2/2011 | Quarto | G01R 31/343 324/765.01 |
| 2011/0031911 A1 | 2/2011 | Marcinkiewicz et al. | |
| 2011/0040436 A1* | 2/2011 | Yamamoto | B60K 6/32 701/22 |
| 2011/0066311 A1* | 3/2011 | Itagaki | B60K 6/445 701/22 |
| 2011/0178664 A1* | 7/2011 | Yamamoto | B60L 3/0046 701/22 |
| 2011/0238245 A1* | 9/2011 | Gallegos-Lopez | B60L 11/14 701/22 |
| 2011/0257825 A1* | 10/2011 | Yamamoto | B60L 3/0092 701/22 |
| 2011/0261601 A1 | 10/2011 | Chapman et al. | |
| 2011/0288710 A1* | 11/2011 | Ito | B60L 11/123 701/22 |
| 2011/0307129 A1 | 12/2011 | Yu et al. | |
| 2012/0013284 A1 | 1/2012 | Campbell | |
| 2012/0051094 A1* | 3/2012 | George | H02M 3/3376 363/17 |
| 2012/0104861 A1 | 5/2012 | Kojori et al. | |
| 2012/0212176 A1 | 8/2012 | Park | |
| 2012/0232728 A1 | 9/2012 | Karimi et al. | |
| 2012/0323417 A1* | 12/2012 | Rumer | G01M 15/02 701/22 |
| 2013/0049657 A1* | 2/2013 | Rozman | B60W 10/08 318/400.3 |
| 2013/0082664 A1 | 4/2013 | Hiraoka et al. | |
| 2013/0083563 A1 | 4/2013 | Wang et al. | |
| 2013/0154264 A1* | 6/2013 | Hatanaka | B60L 3/003 290/45 |
| 2013/0201733 A1 | 8/2013 | Divan et al. | |
| 2013/0250624 A1 | 9/2013 | Fornage | |
| 2013/0250634 A1 | 9/2013 | Fornage | |
| 2013/0257301 A1 | 10/2013 | Tran | |
| 2013/0343105 A1 | 12/2013 | Kosugi | |
| 2014/0042948 A1 | 2/2014 | Green et al. | |
| 2014/0226379 A1 | 8/2014 | Harrison | |
| 2014/0233289 A1 | 8/2014 | Zhao et al. | |
| 2014/0252896 A1 | 9/2014 | Nardin | |
| 2015/0021983 A1* | 1/2015 | Karimi | B60R 16/033 307/9.1 |
| 2015/0022245 A1* | 1/2015 | Gao | G05F 1/462 327/109 |
| 2015/0097432 A1* | 4/2015 | Gurin | H02P 9/008 307/31 |
| 2015/0109833 A1 | 4/2015 | Garrity et al. | |
| 2015/0141198 A1* | 5/2015 | Tomo | B60W 10/02 477/5 |
| 2015/0280455 A1 | 10/2015 | Bosshard et al. | |
| 2016/0094039 A1 | 3/2016 | Winstanley et al. | |
| 2016/0107635 A1* | 4/2016 | Kodawara | B60K 6/48 701/22 |
| 2016/0200200 A1* | 7/2016 | Nakata | B60W 10/184 303/3 |
| 2017/0141717 A1 | 5/2017 | Winstanley et al. | |

FOREIGN PATENT DOCUMENTS

| | | |
|---|---|---|
| EP | 1320167 A1 | 6/2003 |
| EP | 1921742 A2 | 5/2008 |
| EP | 2445110 A1 | 4/2012 |
| EP | 2777974 A2 | 9/2014 |
| EP | 2942679 A2 | 11/2015 |
| WO | 1990013178 A1 | 11/1990 |
| WO | 2005015741 A2 | 2/2005 |
| WO | 2012171938 A2 | 12/2012 |
| WO | 2013138219 A1 | 9/2013 |
| WO | 2014025734 A2 | 2/2014 |

OTHER PUBLICATIONS

U.S. Appl. No. 14/570,145, entitled EMI Filter Systems and Methods for Parallel Modular Converters, filed Dec. 15, 2014.

Extended European Search Report for 161774583-1807, Nov. 2, 2016.

Extended European Search Report for EP 15187281.9, dated Jun. 28, 2016.

(56) References Cited

OTHER PUBLICATIONS

Partial European Search Report for EP 15187281, dated Feb. 26, 2016.
Y. Panov et al., "Loop Gain Measurement of Paralleled Dc-Dc Converters With Average-Current-Sharing Control,", IEEE, Nov. 2008, 6 pages.
European Search Report for EP 14172775.0, dated Dec. 3, 2014.
Bortis et al., "Active Gate Control for Current Balancing of Parallel-Connected IGBT Modules in Solid-State Modulators", IEEE Transactions on Plasma Science, vol. 36, No. 5, Oct. 2008, pp. 2632-2637 [abstract only].
Hofer et al., "Paralleling intelligent IGBT power modules with active gate-controlled current balancing", PESC Record: Annual IEEE Power Electronics Specialists Conferences, Jun. 1996, pp. 1312-1316. [abstract only].
European Search Report for EP 14177338.2, dated Apr. 15, 2015.

\* cited by examiner

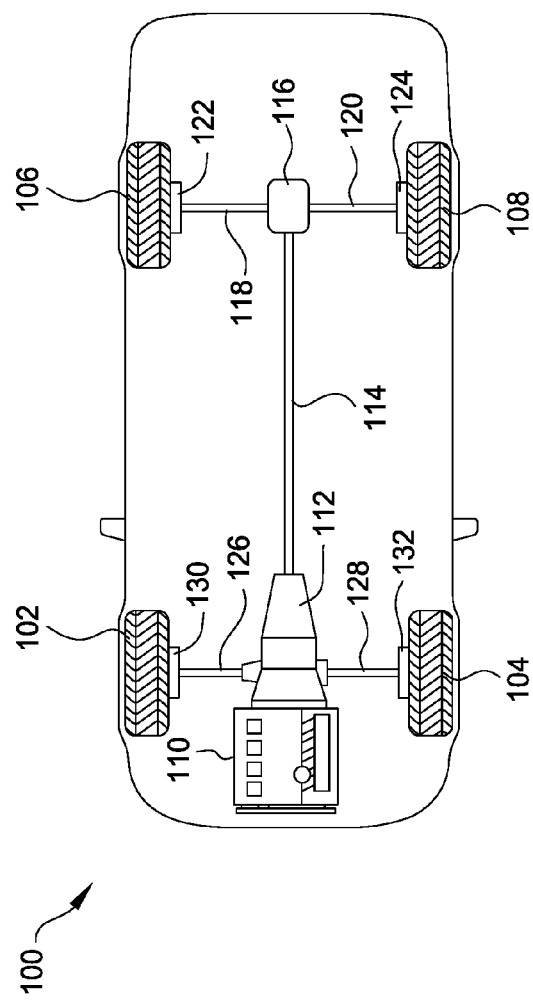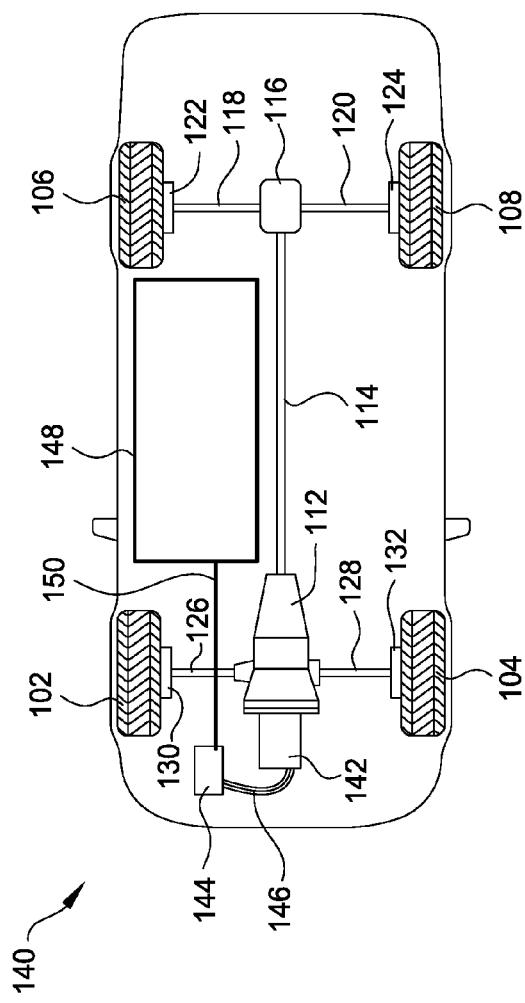

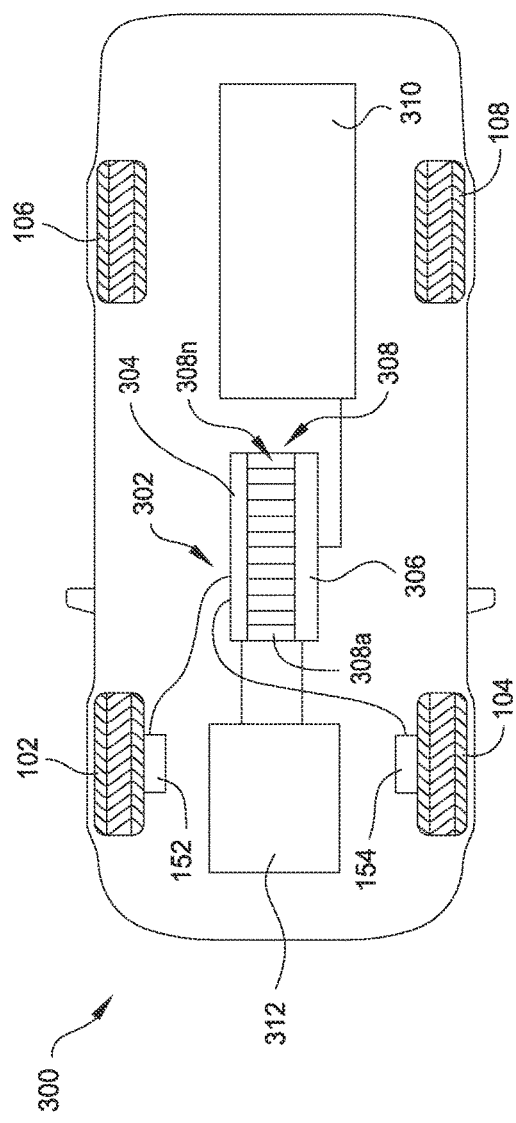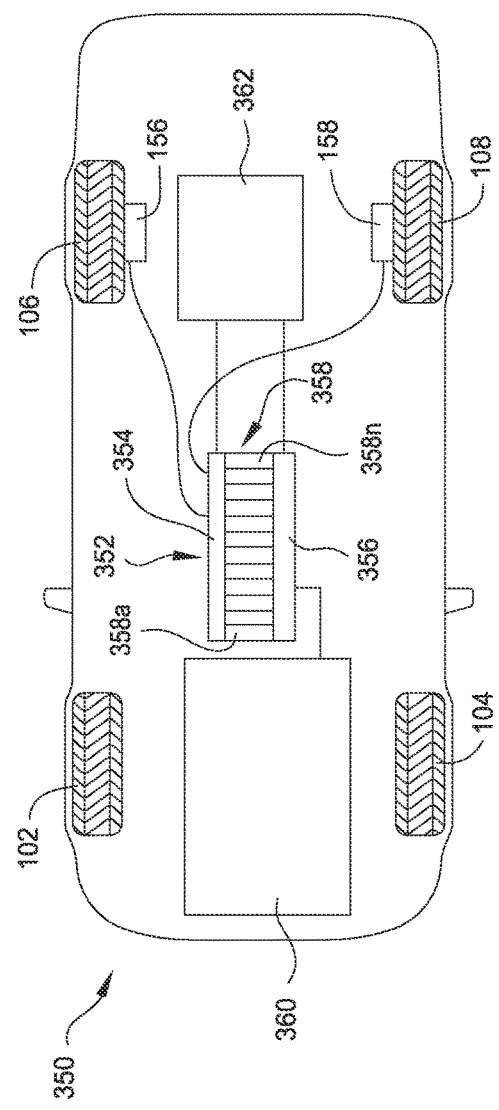

PARALLEL MODULAR CONVERTER ARCHITECTURE FOR EFFICIENT GROUND ELECTRIC VEHICLES

CROSS-REFERENCE TO RELATED APPLICATIONS

This application is related to the following published patent documents: U.S. Pat. No. 9,647,455 entitled "EMI Filter Systems and Methods For Parallel Modular Converters", pre-grant publication 2016/0094039 entitled "Parallel Modular Converter Architecture", U.S. Pat. No. 9,046,912 entitled "Thermally Balanced Parallel Operation of Transistors", U.S. Pat. No. 9,804,613 entitled "Parallel Transistor Circuit Controller", U.S. Pat. No. 9,533,638 entitled "Aircraft Universal Power Converter", and U.S. Pat. No. 8,972,765 entitled "Electrical Energy Management Method and Apparatus For Multiple Distribution Buses and Batteries".

BACKGROUND

Aspects described herein relate to electrical power distribution, and more specifically, to switching parallel power converters to provide power to electric motors.

Electric vehicles typically use power converters to convert direct current (DC) power from a battery to alternating current (AC) power for use by electric motors that drive the wheels of the vehicles. Power converters are rated to convert a certain amount of power. Increasing the rating of the power converter results in a power converter that is heavier and more expensive. In instances in which separate motors drive the different wheels of the vehicle, dedicated power converters have been provided for each of the motors. However, determining an appropriate power rating for the dedicated power converters requires a tradeoff. For example, consider a front-wheel drive vehicle that includes an AC motor at each front wheel and a 100 kilowatt (kW) battery. In such an exemplary vehicle, the dedicated power converters for each wheel could have a rating of 50 kW to evenly split the power of the battery between the two motors. However, if one of the wheels does not have traction (e.g., is on ice or mud), 50% of the vehicle power is unusable. To avoid having unusable power, the ratings for the dedicated power converters could each be increased to (up to) 100 kW so that all of the power from the battery could be directed to one motor in the event that one of the wheels does not have traction. However, providing 100 kW power converters to each wheel would increase the cost and weight of the vehicle.

SUMMARY

According to one aspect, a vehicle includes a plurality of wheels and a plurality of motors coupled to respective ones of the plurality of wheels. The vehicle also includes a parallel modular converter (PMC). The PMC includes a plurality of parallel power converters (PPC). The PMC selectively connects different ones of the PPCs to the motors of the plurality of motors based on load conditions of the motors of the vehicle. The PPCs apply electric power to the respective connected motors.

According to one aspect, a system includes a parallel modular converter (PMC). The PMC includes a plurality of parallel power converters (PPC) and a plurality of power outputs. The PMC selectively connects respective ones of the PPCs to the power outputs based on load conditions of power sinks that are connected to the power outputs.

According to one aspect, a method includes detecting load requests from a plurality of power sinks connected to a parallel modular converter (PMC) that includes a plurality of parallel power converters (PPC). The method also includes selectively connecting the PPCs to the power sinks to drive the power sinks, based on the load requests.

BRIEF DESCRIPTION OF THE SEVERAL VIEWS OF THE DRAWINGS

FIG. 1A is a top schematic view of a drive train for a vehicle using an internal combustion engine, transaxle, and drive shafts;

FIG. 1B is a top schematic view of a drive train for a vehicle similar to the vehicle of FIG. 1A, except the internal combustion engine has been replaced by an electric motor arrangement;

FIG. 3A is a top schematic view of a drive train for a vehicle according to at least one aspect in which the front wheels of the vehicle are powered by electric motors, and wherein the electric motors share a common array of parallel power converters that can be selectively connected to the different electric motors;

FIG. 3B is a top schematic view of a drive train for a vehicle according to at least one aspect in which the rear wheels of the vehicle are powered by electric motors, and wherein the electric motors share a common array of parallel power converters that can be selectively connected to the different electric motors.

DETAILED DESCRIPTION

Figure 1C:
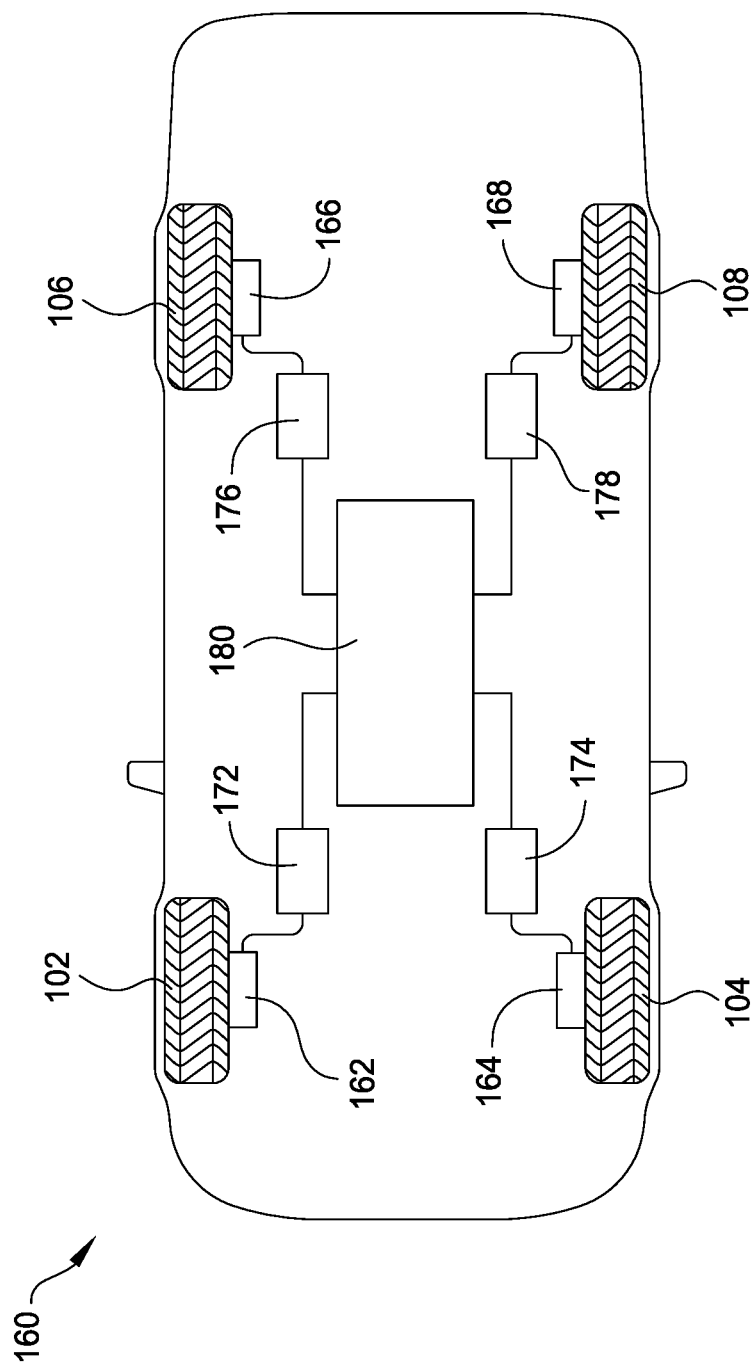
FIG. 1C is a top schematic view of a drive train for a vehicle in which each wheel of the vehicle is powered by an electric motor and a dedicated power converter.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect embodiment is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Electric vehicles are becoming more common. In some instances, an electric vehicle may be very similar to an internal combustion engine vehicle, except that the internal combustion engine has been replaced or augmented with an electric motor. FIG. 1A illustrates a typical configuration for a vehicle 100 having an internal combustion engine 110. The internal combustion engine 110 is connected to a transmission or transaxle 112. The transaxle 112 can include a gear set that has various gear ratios. The transaxle 112 can also include power outputs that are coupled to driven wheels of the vehicle. For example, as shown, a drive shaft 114 is connected to a power output from the transaxle 112. The drive shaft 114 is coupled to a differential 116, and output shafts 118 and 120 extend from the differential 116 at a rear end of the vehicle 100. Output shaft 118 can drive a first rear wheel 106 of the vehicle 100 and output shaft 120 can drive a second rear wheel 108 of the vehicle 100. The transaxle 112 can also include power outputs for drive shafts 126 and 128 located at the front end of the vehicle 100. Drive shaft 126 can drive a first front wheel 102 and drive shaft 128 can drive a second front wheel 104. The vehicle 100 also includes brakes arranged at the various wheels to slow and/or stop the vehicle. For example, a first brake 130 is associated with the first front wheel 102, a second brake 132 is associated with the second front wheel 104, a third brake 122 is associated with the first rear wheel 106, and a fourth brake 124 is associated with the second rear wheel 108.

As discussed above, in various instances, the internal combustion engine could be replaced with an electric motor. FIG. 1B illustrates a vehicle 140 in which an electric motor 142 has replaced the internal combustion engine 110 of the vehicle 100 shown in FIG. 1A. The electric motor 142 is connected to an inverter 144, which converts direct current (DC) power from a battery 148 into alternating current (AC) power suitable for use by the electric motor 142. The electric motor 142 is coupled to the inverter 144 by a cable 146 and the inverter 144 is coupled to the battery 148 by a cable 150. Other than removing the internal combustion engine 110 and adding the electric motor 142, the inverter 144, and the battery 148, the vehicle 140 in FIG. 1B is similar to the vehicle 100 in FIG. 1A.

In another aspect, a vehicle may be equipped with multiple power sources, rather than one central power source that drives all of the wheels. For example, FIG. 1C illustrates an electric vehicle 160 that includes a respective electric motor (e.g., a hub motor) at each wheel. For example, a first electric motor 162 drives the first front wheel 102, a second electric motor 164 drives the second front wheel 104, a third electric motor 166 drives the first rear wheel 106, and a fourth electric motor 168 drives the second rear wheel 108. Each electric motor is paired with one or more inverters (i.e., power controllers) to convert DC power from a battery 180 into AC power that is usable by the electric motor. For example, the first electric motor 162 is connected to the first inverter(s) 172, the second electric motor 164 is connected to the second inverter(s) 174, the third electric motor 166 is connected to the third inverter(s) 176, and the fourth electric motor 168 is connected to the fourth inverter(s) 178. Power inverters are only rated to handle a particular amount of power. For example, suppose the battery 180 is capable of outputting 200 kW of power and, under ideal circumstances, each of the motors 162, 164, 166, and 168 is provided with 50 kW of power. Under such circumstances, power inverters that can handle 50 kW would be sufficient for each motor. Put differently, the first power inverter 172, the second power inverter 174, the third power inverter 176, and the fourth power inverter 178 would each be able to handle 50 kW. However, under certain circumstances, one or more of the motors 162, 164, 166, and 168 may not be able to use the full 50 kW power output by the battery 180. For example, environmental conditions, such as ice under the rear wheels 106 and 108, could limit available traction. As another example, the motors 166 and 168 associated with the rear wheels 106 and 108 could have malfunctioned. In either example, only the motors 162 and 164 associated with the front wheels 102 and 104, respectively, would be powered at their rated power (the other motors would either not be powered at all or would be powered at less than their rated power). In those cases where the rear motors 166 and 168 are not powered at all, the full 200 kW power would be available for the front motors 162 and 164. However, to use the full 200 kW of power the power inverter(s) 172 and 174 associated with each of the front wheels 102 and 104, respectively, would each have to be rated to handle 100 kW. Sizing the power inverters 172, 174, 176, and 178 to handle such circumstances could result in the electric vehicle 160 carrying significantly more power inverters or higher-rated power inverters than would be required for most operating conditions, resulting in increased cost and/or weight for the electric vehicle 160.

Figure 2A:
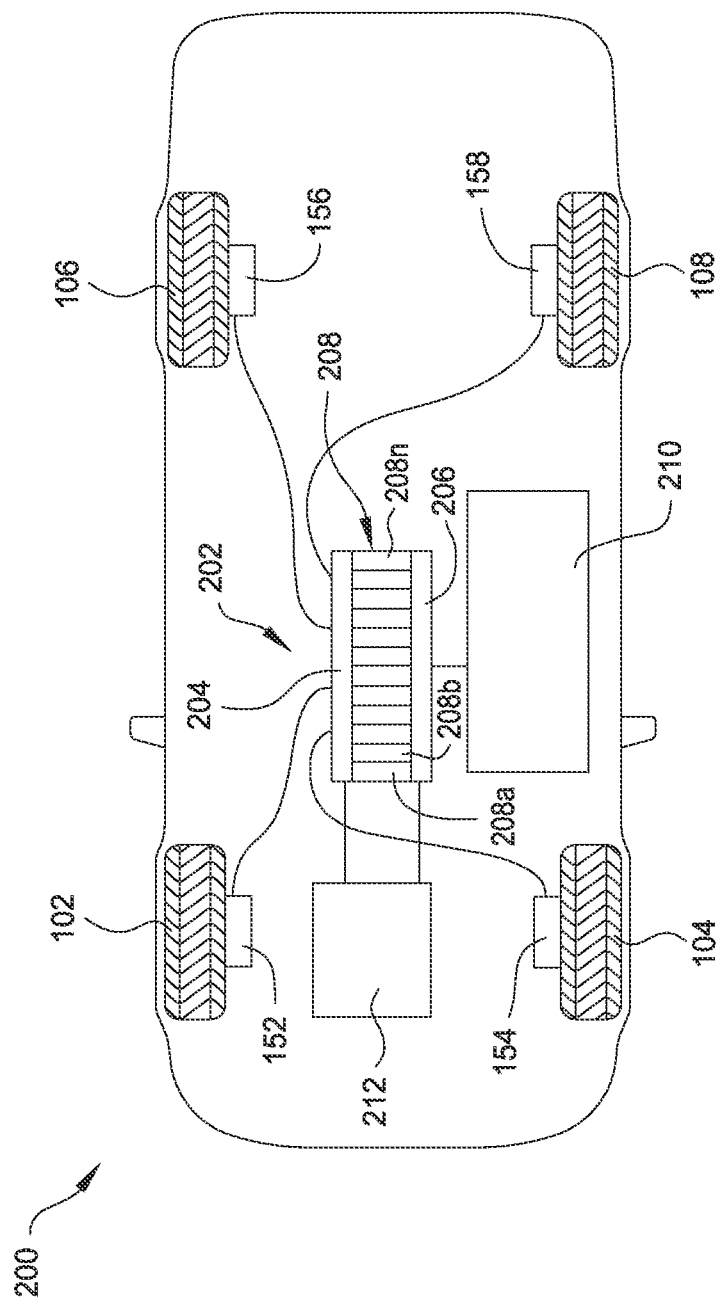
FIG. 2A is a top schematic view of a drive train for a vehicle according to at least one aspect in which each wheel of the vehicle is powered by an electric motor, and wherein the electric motors share a common array of parallel power converters that can be selectively connected to the different electric motors.

In various aspects, a common group of power inverters are shared by multiple electric motors. A switching network is connected to the electric motors and to the power inverters to selectively couple different numbers of power inverters to the electric motors. By selectively switching power inverters among the electric motors as load conditions change, a smaller total number of power inverters can be used (compared to the total number of power inverters shown in the configuration of FIG. 1C) while providing the same power capacity. FIG. 2A illustrates an electric vehicle 200 that includes a parallel modular converter (PMC) 202 to distribute electrical power to electric motors 152, 154, 156, and 158 at the wheels 102, 104, 106, and 108 of the electric vehicle 200. The PMC 202 includes a centralized group of parallel power converters (PPC) 208*a*, 208*b*, ..., 208*n* (i.e., power inverters) that are electrically connected in parallel, discussed in greater detail below. In various aspects, the PMC 202 could include between two and twenty PPCs 208. In various other aspects, the PMC 202 could include between five and ten PPCs 208. The PMC 202 also includes a power supply bus 206 and a switching network 204. The PPCs 208*a*, 208*b*, ..., 208*n* (208, collectively) are connected to the power supply bus 206, which, in turn, is connected to a power supply 210 (e.g., a battery, a fuel cell, or the like). The PPCs 208 are selectively connectable to the electric motors 152, 154, 156, and 158 by the switching network 204. The PMC 202 can also include and/or can be in communication with a controller 212. The controller 212 can control operation of the switches within the switching network, described below, and can also control operation of the PPCs.

In one aspect, the PPCs 208 may be arranged as metal-oxide-semiconductor field-effect-transistor (MOSFET) and/or insulated gate bipolar transistor (IGBT) inverters using pulse width modulation for control. To output an AC power signal at 60 Hz, for example, the MOSFET inverter may operate at a significantly higher frequency. For example, the transistors of the MOSFET inverter may operate at a frequency between 1 kHz and 1 MHz. As another example, the transistors of the MOSFET inverter may operate at a frequency between 3 kHz and 15 kHz. To provide the varying levels of voltage for an AC power signal, the transistors of the MOSFET inverter are switched on and off at varying ratios. For example, at moments when the voltage is supposed to be at a maximum level, the transistors of the MOSFET inverter are always on (i.e., always passing power through). At moments when the voltage is supposed to be at half the maximum level, the transistors of the MOSFET inverter are on half the time and off half the time. To synchronize the various AC power signals of the PPCs 208, the controller 212 can provide a master control signal (e.g., a pulse width modulation signal) to the PPCs 208.

Figure 2B:
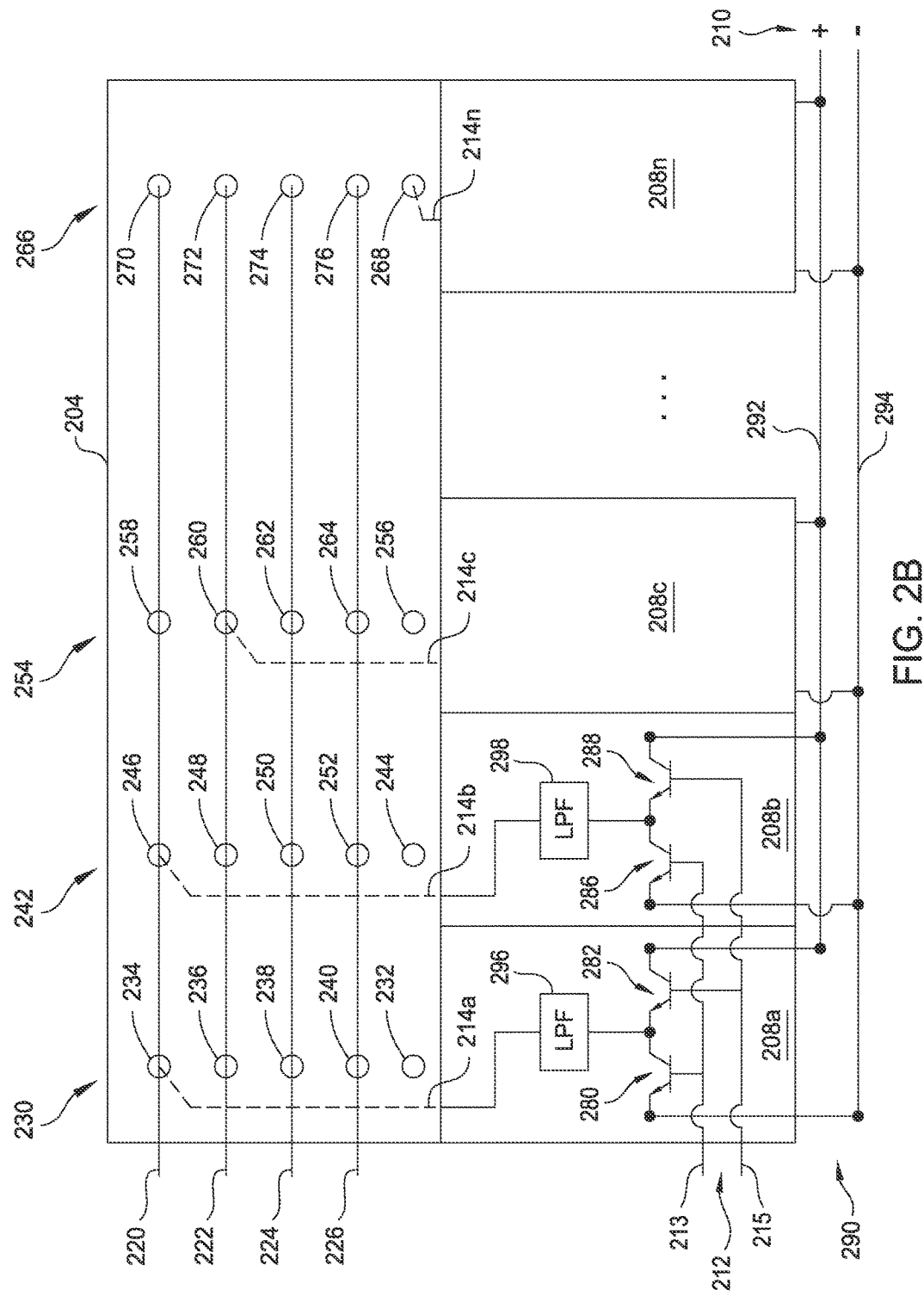
FIG. 2B is a detail schematic view of several parallel power converters of FIG. 2A and a switching network configured to selectively connect the parallel power converters to electric motors.

FIG. 2B is a schematic view of the switching network 204 connected to the PPCs 208. The switching network 204 can include a first output power bus 220, a second output power bus 222, a third output power bus 224, and a fourth output power bus 226. The first output power bus 220 can be connected to the first electric motor 152 that drives the first front wheel 102 of the vehicle 200. The second output power bus 222 can be connected to the second electric motor 154 that drives the second front wheel 104 of the vehicle 200. The third output power bus 224 can be associated with the third electric motor 156 that drives the third wheel 106 of the vehicle 200. The fourth output power bus 226 can be associated with the fourth electric motor 158 that drives the fourth wheel 108 of the vehicle 200. The switching network 204 could include mechanical contactors and/or solid state relays.

In various aspects, the PPCs 208 can be selectively connected to output power buses 220, 222, 224, and 226. For example, the switching network 204 illustrated in FIG. 2B includes a first array of selectable connections 230 used by a first PPC 208a, a second array of selectable connections 242 used by a second PPC 208b, a third array of selectable connections 254 used by a third PPC 208c, and an nth array of selectable connections 266 used by an nth PPC 208n. The first array of selectable connections 230 includes a first contact 234 that is electrically connected to the first output power bus 220, a second contact 236 that is electrically connected to the second output power bus 222, a third contact 238 that is electrically connected to the third output power bus 224, and a fourth contact 240 that is electrically connected to the fourth output power bus 226. The first array of selectable connections 230 could also include a null contact 232 that is not connected to any of the output power buses. A power output 214a from the first PPC 208a can be selectively connected to the first contact 234, the second contact 236, the third contact 238, or the fourth contact 240 by the controller 212 to couple the power output from the first PPC 208a to the first power bus 220, the second power bus 222, the third power bus 224, or the fourth power bus 226, respectively. The power output 214a from the first PPC 208a could be selectively connected to the null contact 232 by the controller 212 in the event power from the first PPC 208a is not needed at a particular moment.

The second array of selectable connections 242 includes a first contact 246 that is electrically connected to the first output power bus 220, a second contact 248 that is electrically connected to the second output power bus 222, a third contact 250 that is electrically connected to the third output power bus 224, and a fourth contact 252 that is electrically connected to the fourth output power bus 226. The second array of selectable connections 242 could also include a null contact 244 that is not connected to any of the output power buses. A power output 214b from the second PPC 208b can be selectively connected to the first contact 246, the second contact 248, the third contact 250, or the fourth contact 252 by the controller 212 to couple the power output from the second PPC 208b to the first power bus 220, the second power bus 222, the third power bus 224, or the fourth power bus 226, respectively. The power output 214b from the second PPC 208b could be selectively connected to the null contact 244 by the controller 212 in the event power from the second PPC 208b is not needed at a particular moment.

The third array of selectable connections 254 includes a first contact 258 that is electrically connected to the first output power bus 220, a second contact 260 that is electrically connected to the second output power bus 222, a third contact 262 that is electrically connected to the third output power bus 224, and a fourth contact 264 that is electrically connected to the fourth output power bus 226. The third array of selectable connections 254 could also include a null contact 256 that is not connected to any of the output power buses. A power output 214c from the third PPC 208c can be selectively connected to the first contact 258, the second contact 260, the third contact 262, or the fourth contact 264 by the controller 212 to couple the power output from the third PPC 208c to the first power bus 220, the second power bus 222, the third power bus 224, or the fourth power bus 226, respectively. The power output 214c from the third PPC 208c could be selectively connected to the null contact 256 by the controller 212 in the event power from the third PPC 208c is not needed at a particular moment.

The nth array of selectable connections 266 includes a first contact 270 that is electrically connected to the first output power bus 220, a second contact 272 that is electrically connected to the second output power bus 222, a third contact 274 that is electrically connected to the third output power bus 224, and a fourth contact 276 that is electrically connected to the fourth output power bus 226. The nth array of selectable connections 254 could also include a null contact 268 that is not connected to any of the output power buses. A power output 214n from the nth PPC 208n can be selectively connected to the first contact 270, the second contact 272, the third contact 274, or the fourth contact 276 by the controller 212 to couple the power output from the nth PPC 208n to the first power bus 220, the second power bus 222, the third power bus 224, or the fourth power bus 226, respectively. The power output 214n from the nth PPC 208n could be selectively connected to the null contact 268 by the controller 212 in the event power from the nth PPC 208n is not needed at a particular moment.

FIG. 2B illustrates an exemplary scenario in which the power output 214a of the first PPC 208a is selectively connected to contact 234 on the first power bus 220 by the controller 212. FIG. 2B also illustrates the power output 214b of the second PPC 208b selectively connected to contact 246 on the first power bus 220 by the controller 212, the power output 214c of the third PPC 208c selectively connected to contact 260 on the second power bus 222 by the controller 212, and the power output 214n of the nth PPC 208n selectively connected to the null contact 268 by the controller 212. Power outputs of PPCs that are not illustrated in FIG. 2B could be connected to similar contacts to couple those power outputs to the various power buses and/or no connections. In the exemplary scenario illustrated in FIG. 2B, the first PPC 208a and the second PPC 208b are electrically connected in parallel to the first power bus 220. In FIG. 2B, a simplified schematic circuit diagram for MOSFET-based power converters are shown. In various aspects, the circuitry could include circuitry for three-phase current operation, for example. The first PPC 208a includes a first MOSFET 280 and a second MOSFET 282. The first MOSFET 280 is electrically connected to the negative or ground terminal 294 of the DC power bus 290 from the power source 210. The second MOSFET 282 is electrically connected to the positive terminal 292 of the DC power bus 290. The first MOSFET 280 and the second MOSFET 282 are connected to a low pass filter 296, which is then connected to the power output 214a for the first PPC 208a. The second PPC 208b includes a third MOSFET 286 and a fourth MOSFET 288. The third MOSFET 286 is electrically connected to the negative or ground terminal 294 of the DC power bus 290 from the power source 210. The fourth MOSFET 288 is electrically connected to the positive terminal 292 of the DC power bus 290. The third MOSFET 286 and the fourth MOSFET 288 are connected to a low pass filter 298, which is then connected to the power output 214b for the second PPC 208b. As can be seen, the MOSFET circuits of the first PPC and the second PPC are electrically connected in parallel between the DC power bus 290 and the first power bus 220 in the illustrated exemplary scenario. The first MOSFET 280 and the third MOSFET 286 are electrically connected by a first communication channel 213 to the controller 212. The controller 212 can output a first pulse width modulation signal on the first communication channel 213 to cause the first MOSFET 280 and the third MOSFET 286 to open and close. The second MOSFET 282 and the fourth MOSFET 288 are electrically connected by a second communication channel 215 to the controller 212. The controller 212 can output a second pulse width modulation signal on the second communication channel 215 to cause the second MOSFET 282 and the fourth MOSFET 288 to open and close. Since the first MOSFET 280 and the third MOSFET 286 are connected to the same communication channel 213, the operation of the first MOSFET 280 and the third MOSFET 286 are synchronized by the first pulse width modulation signal such that the first MOSFET 280 and the third MOSFET 286 output power signals with the same waveform. Since the second MOSFET 282 and the fourth MOSFET 288 are connected to the same communication channel 215, the operation of the second MOSFET 282 and the fourth MOSFET 288 are synchronized by the second pulse width modulation signal such that the second MOSFET 282 and the fourth MOSFET 288 output power signals with the same waveform. In various aspects, each MOSFET could receive a dedicated pulse width modulation signal from the controller 212. The controller 212 could synchronize operation of a subset of the PPCs (e.g., PPCs that are connected to the same output power bus could be synchronized). The first power bus 220 can transmit the combined power output of the first PPC 208a and the second PPC 208b to the wheel motor 152 for the first front wheel 102 of the vehicle 200. The second power bus 222 is receiving power output from the third PPC 208c. The second power bus 222 can transmit the power output from the third PPC 208c to the wheel motor 154 for the second front wheel 104 of the vehicle 200.

In various aspects, certain connections in the switching network 204 could be fixed or predetermined. For example, one PPC could be permanently assigned to each of the wheel motors. For example, the first PPC 208a could be permanently connected to the first power bus 220 (and therefore to the wheel motor 152 for the first front wheel 102). Also, the second PPC 208b could be permanently connected to the second power bus 222 (and therefore to the wheel motor 154 for the second front wheel 104). Also, the third PPC 208c could be permanently connected to the third power bus 224 (and therefore to the wheel motor 156 for the first rear wheel 106). Also, a fourth PPC (e.g., a fourth PPC 208d that is not shown in FIG. 2B) could be permanently connected to the fourth power bus 226 (and therefore to the wheel motor 158 for the second rear wheel 108). Remaining PPCs (e.g., PPC 208n) could be selectively connected to the various power buses by the controller 212, as described above.

In various aspects, certain PPCs in the switching network 204 could be limited to connecting to certain power buses. For example, the first PPC 208a could be limited to only be selectively connectable to the first power bus 220 (via contact 234) or to the second power bus 222 (via contact 236). Put differently, the contact 238 to the third power bus 224 and the contact 240 to the fourth power bus 226 could be omitted from the switch 204. As a result, the first PPC 208a would be selectively connectable to a power bus for the wheel motors 152 and 154 for the front wheels 102 and 104, respectively, of the vehicle 200. As another example, the second PPC 208b could be limited to only be selectively connectable to the third power bus 224 (via contact 250) or to the fourth power bus 226 (via contact 252). Put differently, the contact 246 to the first power bus 220 and the contact 248 to the second power bus 222 could be omitted from the switch 204. As a result, the second PPC 208b would be selectively connectable to a power bus for the wheel motors 156 and 158 for the rear wheels 106 and 108, respectively, of the vehicle 200. By fixing certain PPCs to certain power buses and/or by limiting the selectable contacts for certain PPCs, the switch network 204 may be simplified.

In use, the switching network 204 can selectively connect the various PPCs 208 to the power buses 220, 222, 224, and 226 to provide power to the electric motors 152, 154, 156, and 158 based on load requests and/or environmental conditions. As a first example, consider a scenario in which the vehicle 200 accelerates and then decelerates. During acceleration, the distribution of the weight of the vehicle on the wheels 102, 104, 106, 108 shifts toward the rear wheels 106 and 108. As a result, the rear wheels 106 and 108 have more traction than the front wheels 102 and 104. Therefore, it could be advantageous to provide more power to the electric motors 156 and 158 of the rear wheels 106 and 108 than to the electric motors 152 154 of the front wheels 102 and 104. For example, in various aspects, the PMC could include eight PPCs and, under steady-state driving conditions, each of the power buses in the switching network (that are connected to the electric motors 152, 154, 156, and 158) could be selectively connected to two of the eight PPCs. Under acceleration conditions, one of the two PPCs connected to a first power bus (connected to the electric motor 152 of the first front wheel 102) could be disconnected from the first power bus and selectively connected to a third power bus such that the power from that PPC is provided to the electric motor 156 of the first rear wheel 106. Also, one of the two PPCs connected to a second power bus (connected to the electric motor 154 of the second front wheel 104) could be disconnected from the second power bus and selectively connected to a fourth power bus such that the power from that PPC is provided to the electric motor 158 of the second rear wheel 108.

During deceleration, the electric motors 152, 154, 156, and 158 can act as power generators, providing electricity to recharge the power source 210. For example, each of the electric motors 152, 154, 156, and 158 could provide AC power to the switching network and to the PPCs. The PPCs could convert the provided AC power to DC power, which is then provided to the power supply bus and then to the power supply. During deceleration, the distribution of the weight of the vehicle on the wheels 102, 104, 106, 108 shifts toward the front wheels 102 and 104. As a result, the front wheels 102 and 104 have more traction than the rear wheels 106 and 108. Therefore, it could be advantageous to draw more power from the electric motors 152 and 154 of the front wheels 102 and 104 than to the electric motors 156, 158 of the rear wheels 106 and 108. Continuing the example above in which the vehicle 200 includes eight PPCs, under deceleration conditions, one of the two PPCs connected to the third power bus (connected to the electric motor 156 of the first rear wheel 106) could be disconnected from the first power bus and selectively connected to the first power bus such that the power drawn from the electric motor 152 of the first front wheel 102 is provided to that PPC. Also, one of the two PPCs connected to the fourth power bus (connected to the electric motor 158 of the second rear wheel 158) could be disconnected from the fourth power bus and selectively connected to the second power bus such that the power drawn from the electric motor 154 of the second front wheel 104 is provided to that PPC.

In various aspects, the PMC could selectively connect more PPCs to electric motors on the outside of a turn then on inside of a turn. For example, suppose the vehicle 200 is turning to the right. Continuing the example above in which the vehicle 200 includes eight PPCs, under such turning conditions, one of the two PPCs connected to the second power bus (connected to the electric motor 154 of the second front wheel 104) could be disconnected from the second power bus and selectively connected to the first power bus such that the power from that PPC is provided to the electric motor 152 of the first front wheel 102. Also, one of the two PPCs connected to the fourth power bus (connected to the electric motor 158 of the second rear wheel 108) could be disconnected from the fourth power bus and selectively connected to the third power bus such that the power from that PPC is provided to the electric motor 156 of the first rear wheel 106. A left turn could involve selectively connecting PPCs in a manner opposite to that described above with respect to the right hand turn. By providing more power to the electric motors 152 and 156 of the right side wheels 102 and 106, respectively, the PMC 202 can provide steering assistance to the vehicle 200.

In various aspects, the switching network 204 could selectively connect a particular PPC to more than one power bus. For example, consider an exemplary scenario in which the vehicle 200 is moving very slowly in stop and go traffic. In such a scenario, a single PPC may satisfy the power requirements for the electric motors. The switching network 204 could simultaneously and selectively connect the first PPC 208a to the connection 234 for the first power bus 220, the connection 236 for the second power bus 222, the connection 238 for the third power bus 224, and connection 240 for the fourth power bus 226. The switching network 204 could leave the remaining PPCs disconnected (i.e., connected to the null connections). In various aspects, the power requirements of the vehicle 200 may be determined, in part, based on the extent to which a vehicle operator actuators a vehicle control, such as an accelerator pedal. In various aspects, the power requirements of the vehicle could be determined, in part, based on a selected mode of operation (e.g., city mode, performance mode, or the like).

FIG. 3A illustrates an aspect in which a vehicle 300 is only driven by electric motors 152 and 154 at its front wheels 102 and 104, respectively. The electric motors 152 and 154 are connected to a PMC 302 that includes a switching network 304, a power supply bus 306, and PPCs 308. The power supply bus 306 is attached to a power source 310, such as a battery, a capacitor, a fuel cell, or the like. The PMC 302 can include and/or can be in communication with a controller 312. FIG. 3B illustrates an aspect in which a vehicle 350 is only driven by electric motors 156 and 158 at its rear wheels 106 and 108, respectively. The electric motors 156 and 158 are connected to a PMC 352 that includes a switching network 354, a power supply bus 356, and PPCs 358. The power supply bus 356 is attached to a power source 360, such as the battery, capacitor, fuel cell, or the like. The PMC 352 can include and/or can be in communication with a controller 362.

The switching networks 304 and 354 can be similar to the switching network 204, described above with respect to FIGS. 2A and 2B, except that the switching networks 304 and 354 only have a first power bus and a second power bus since there are only two electric motors in the respective vehicles. Control logic used by the controllers 312 and 362 to selectively connect various PPCs 308 and 358, respectively, to the first power bus and the second power bus could differ from control logic used by the controller 212 in FIG. 2A. For example, as discussed above, the vehicle 200 in FIG. 2A has all four wheels being driven by electric motors, and certain PPCs may be selectively connected to certain motors based on weight transfer during acceleration or deceleration. Such weight transfer considerations may not be relevant in the front-wheel-drive only or rear-wheel-drive only vehicles 300 and 350 shown in FIGS. 3A and 3B, respectively.

Figure 4:
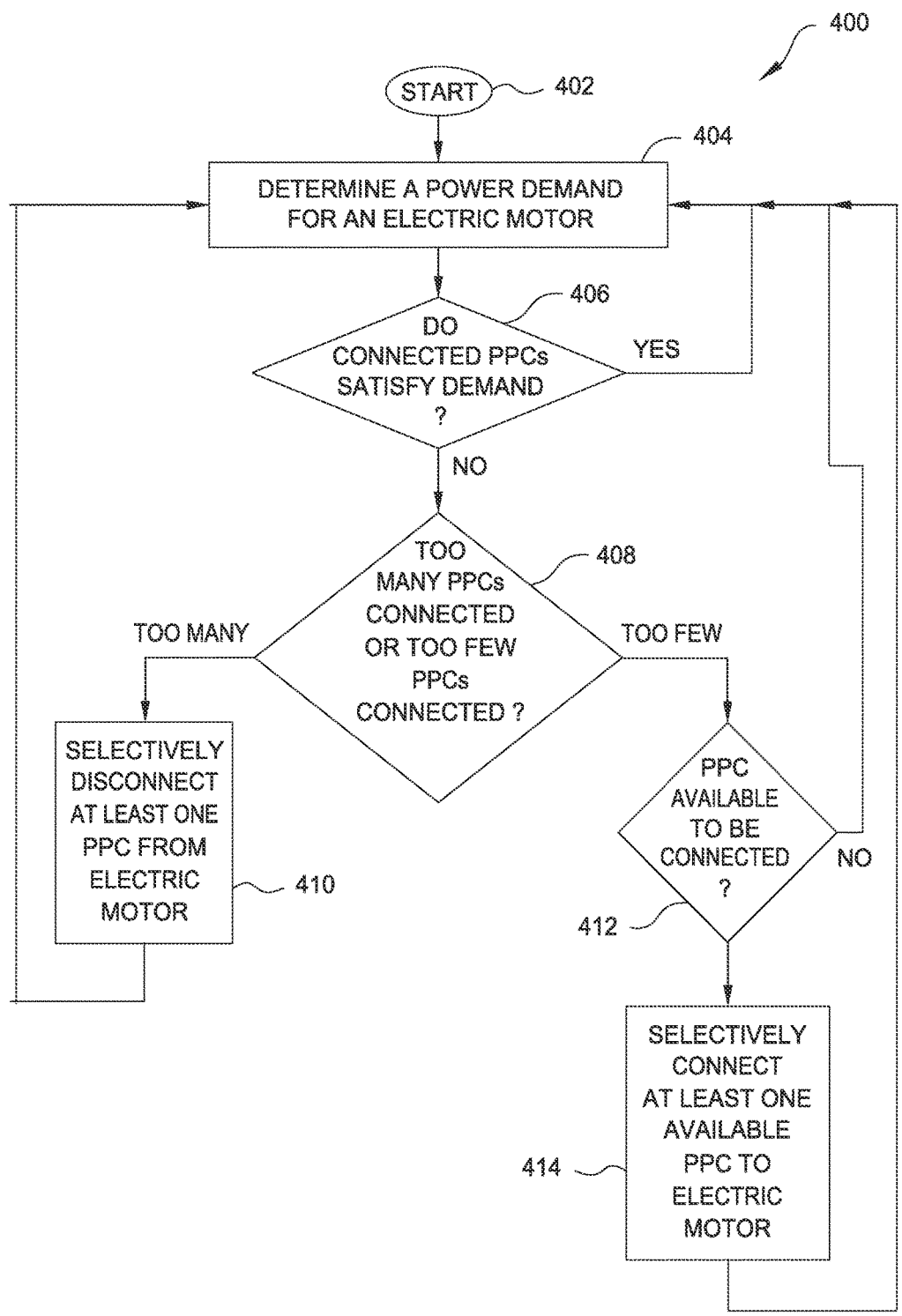
FIG. 4 is a flow chart illustrating a method according to at least one aspect for selectively connecting and/or disconnecting parallel power converters to electric motors.

FIG. 4 is a flowchart illustrating a method 400 for selectively connecting and/or disconnecting PPCs from an electric motor. After the method 400 starts at block 402, the method 400 determines a load condition for an electric motor in block 404. Here, the load condition of the electric motor could be an amount of power required to drive the electric motor or an amount of power that the electric motor is generating (e.g., during regenerative braking). For example, the load condition of an electric motor could be affected by the acceleration, braking, and/or turning demands of the vehicle. In block 406, the method 400 determines whether the PPCs connected to the electric motor satisfy the load condition. If the load condition is satisfied by the connected PPCs, then the method 400 returns to block 404. If the load condition is not satisfied by the connected PPCs, then the method 400 moves to block 408 to determine whether there are too many PPCs connected to the electric motor were too few PPCs connected to the electric motor. There may be too many PPCs connected to the electric motor in the event that the total number of PPCs connected to the electric motor has more capacity than what the electric motor currently requires. For example, an exemplary vehicle according to various aspects could include PPCs that are each rated to transmit 10 kW of electrical power. In an exemplary scenario, a particular electric motor of the vehicle may be demanding 22 kW of electrical power at a given moment. Thus, the particular electric motor would need to be connected to three PPCs. However, if four PPCs are connected to the particular electric motor, then the 10 kW capacity of the fourth PPC is being wasted and could potentially be used elsewhere. In this scenario in which four 10 kW PPCs are connected to the electric motor that is demanding 22 kW of electrical power, too many PPCs are selectively connected to the electric motor. There may also be too many PPCs connected to the electric motor in the event that the motor is outputting too much power (e.g., the wheel being driven by the motor is breaking fraction with the ground) or in the event that the motor is being used for regenerative braking and is generating too much power (e.g., the wheel associated with the motor is beginning to skid). In such events, too many PPCs may be connected to the electric motor. If too many PPCs are connected to the electric motor, then the method 400 moves to block 410 and selectively disconnects at least one PPC from the electric motor. The method 400 then returns to block 404.

Returning to block 408, there are several instances in which too few PPCs may be connected to the electric motor. Referring to the exemplary aspect above in which a vehicle includes PPCs that are each rated at 10 kW, if the electric motor is demanding 22 kW of power but is only selectively connected to two PPCs, then too few PPCs are connected to the electric motor. A third PPC needs to be selectively connected to the electric motor to provide the 22 kW of demanded power. The third PPC could be operated at a derated power setting to only provide the needed 2 kW of power needed from the third PPC. As another example, if the electric motor is being used to provide regenerative braking to a wheel of a vehicle, the electric motor may be providing 20 kW of regenerative braking if it is selectively connected to two of the 10 kW PPCs. However, the electric motor may be able to provide more regenerative braking if the wheel is not skidding. If a vehicle operator request more braking (i.e., more than the 20 kW of regenerative braking currently being provided), then too few PPCs are connected to the electric motor. In the event that too few PPCs are connected to the electric motor, then, in block 412, the method queries whether PPCs are available to be selectively connected to the electric motor. If no PPCs are available to be selectively connected to the electric motor, then the method returns to block 404. If, in block 412, PPCs are available to be selectively connected to the electric motor, then, in block 414, the method 400 selectively connects at least one available PPC to the electric motor. The method 400 and returns to block 404.

In the exemplary aspect discussed above in which a vehicle includes 10 kW PPCs, it is possible that at least a portion of the power capacity of the PPCs could be unutilized. Referring to the exemplary scenario discussed above, an electric motor with an operating demand of 22 kW of power would need three of the 10 kW PPCs to be selectively connected (e.g., 10 kW of power from a first PPC, 10 kW of power from a second PPC, and 2 kW from a third PPC operating at a derated power setting). However, 8 kW of capacity of the third PPC would not be utilized by the electric motor if the third PPC is only connected to the one electric motor. As discussed above, in various aspects, the PMC (e.g., PMC 202 in FIG. 2A) could operate at a very high frequency to switch PPCs between different power buses. In such aspects, the third PPC in this exemplary scenario could be selectively connected to multiple motors for varying times to distribute the power capacity of the third PPC. For example, suppose that the first electric motor is demanding 22 kW of power and a second electric motor is demanding 28 kW of power. A first two 10 kW PPCs could be selectively connected to the first electric motor to provide the first 20 kW of power to the first electric motor and a second two 10 kW PPCs could be selectively connected to the second electric motor to provide the first 20 kW of power to the second electric motor. A fifth 10 kW PPC could be selectively and sequentially connected to the first electric motor and the second electric motor in a repeating manner to provide the extra 2 kW and 8 kW of demanded power, respectively. For example, the fifth PPC could be selectively connected to the first electric motor 20% of a particular time interval and to the second electric motor 80% of the particular time interval.

In various aspects, the PMC (PMC 202 shown in FIG. 2A, PMC 302 shown in FIG. 3A, or PMC 352 shown in FIG. 3B) can implement various vehicle safety and/or stability features, such as antilock braking, traction control, and/or stability control. With respect to antilock braking, as discussed above, the electric motors 152, 154, 156, and 158 can provide regenerative braking by acting as generators that feed electrical power back to the power source 210. In the event that too much electrical power is being drawn from a particular electric motor (such that the wheel associated with that electric motor starts to skid), then the controller could selectively reallocate capacity of the one or more PPCs from that electric motor to reduce the amount of power being drawn from the motor. Once the particular wheel has regained traction (i.e., stopped skidding), the controller could selectively connect the one or more PPCs to the electric motor to restore the power being drawn from the electric motor. The controller could selectively connect and disconnect the PPCs to the particular electric motor many times per second (e.g., tens or hundreds of times per second) to improve traction while maximizing regenerative braking. With respect to traction control, in the event that too much electrical power is being sent to a particular electric motor (such that the wheel associated with the electric motor breaks traction with the ground), then the controller could selectively reallocate capacity one or more PPCs from the electric motor to reduce the amount of power being sent to that motor. Once the particular wheel has regained traction, the controller could selectively connect the one or more PPCs to the electric motor to restore power to the electric motor. The controller could selectively connect and disconnect the PPCs to the particular electric motor many times per second (e.g., tens or hundreds of times per second) to improve traction while maximizing the power output of the electric motors. With respect to stability control, vehicles often apply a particular brake and/or send power to a particular wheel to prevent a vehicle from sliding laterally (e.g., fish tailing). Here, the PMC could selectively connect or disconnect PPCs from the electric motors associated with the wheels of the vehicle requiring more power and/or less power to control a lateral slide. For example, referring to FIG. 2A, suppose that the rear end of the vehicle 200 is sliding laterally to the right. To correct such a lateral slide to the right, power being applied to the electric motor 152 first front wheel 102 could be reduced (or a regenerative braking force could be applied to the electric motor 152 associated with the first front wheel 102) and/or power could be applied to the electric motor 158 associated with the second rear wheel 108. Here, the PMC could selectively disconnect PPCs 208 from the first power bus 220 to reduce power being sent to the first electric motor 152 associated with the first front wheel 102. Also, the PMC could selectively connect PPCs 208 to the fourth power bus 226 to increase power being sent to the fourth electric motor 158 associated with the second rear wheel 108.

In various aspects, a PMC, such as PMC 202, PMC 302, and/or PMC 352 can be used in vehicles other than the four-wheel vehicles 200, 300, and 350, shown in FIGS. 2A, 3A, and 3B, respectively. For example, a PMC could be used on a motorcycle that has electric motors driving the front wheel and the back wheel. As another example, a PMC could be used on a tractor-trailer. For example, tractors powered by internal combustion engines often have two drive axles located behind the cab and a single steering axle in front of the cab. The internal combustion engine drive train could be removed and electric motors could be connected to the various wheels of the tractor. A PMC could be connected to the motors associated with the wheels on the two drive axles of the tractor. In various aspects, electric motors could also be added to the wheels associated with the steering axle, and the PMC could be connected to those motors as well. Tractor-trailer configurations typically include one or two axles arranged proximate to the rear end of the trailer. Typically, the wheels on these axles are not powered. However, in various aspects, electric motors could be added to the wheels of the trailer axle(s), and these electric motors could be connected to the PMC as well.

In various aspects, a PMC, such as PMC 202, PMC 302, and/or PMC 354, could be used in applications other than vehicles. For example, a PMC could be used to drive electric motors (or other power sinks) associated with various air conditioners, hydraulic pumps, water pumps, refrigeration modules, blower units, or the like. As another example, a PMC could be used to drive electric motors for commercial building elevators.

The above-described configurations of electric motors, power inverters, and power supplies in FIGS. 2A, 2B, 3A, and 3B and the method described in FIG. 4 can be advantageous because a smaller total power capacity of the power converters is needed than in other configurations. For example, in the configuration shown in FIG. 1C in which each motor has a dedicated set of power inverters, each set of power inverters must include sufficient power capacity to handle the maximum amount of power that would be sent to the motor. To illustrate, suppose that the vehicle 160 depicted in FIG. 1C has a 100 kW power supply. For any of the four electric motors 162, 164, 166, and 168 to be able to draw the entire 100 kW of power (in the event that three of the four wheels have little or no traction), each of the sets of inverters would need to have 100 kW of capacity. Put differently, the inverter(s) 172 would have 100 kW of power capacity, the inverter(s) 174 would have 100 kW of power capacity, the inverter(s) 176 would have 100 kW of power capacity, and the inverter(s) 178 would have 100 kW of power capacity. In total, the vehicle 160 would have a total of 400 kW of inverter power capacity if the vehicle 160 needs to be able to send all of the power from the power supply 160 to any one of the electric motors 162, 164, 166, and 168. By contrast, the vehicle 200 depicted in FIG. 2A could use the switching network 204 to electrically connect all of the power converters 208 to a single one of the electric motors 162, 164, 166, and 168. Thus, continuing the illustrative scenario in which the power supply 210 has a 100 kW output capacity, the vehicle 200 in FIG. 2A could send all of the power from the power supply 210 to any one of the electric motors 162, 164, 166, and 168 with only a total of 100 kW of inverter power capacity. This reduction in required power inverter capacity could result in significant cost, complexity, and weight savings.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present invention, other and further aspects of the invention may be devised without departing from the basic scope thereof, and the scope thereof is determined by the claims that follow.

What is claimed is:

1. A vehicle, comprising:
   a plurality of wheels;
   a plurality of motors coupled to respective ones of the plurality of wheels; and
   a parallel modular converter (PMC) that includes:
      a plurality of parallel power converters (PPC); and
      wherein the PMC selectively connects different ones of the PPCs to individual motors of the plurality of motors based on load conditions of the plurality of motors, wherein the different ones of the PPCs apply electric power to respective connected motors, and wherein the load conditions of the motors of the vehicle are determined based on environmental conditions.

2. The vehicle of claim 1, wherein the PMC further includes a switching network connected to the plurality of PPCs and the plurality of motors, wherein the switching network selectively connects different ones of the PPCs to the individual motors.

3. The vehicle of claim 1, wherein the load conditions of the motors of the vehicle are further determined based on operating demands.

4. The vehicle of claim 3, wherein the operating demands includes at least one of acceleration demands, braking demands, and turning demands.

5. The vehicle of claim 3, wherein the PMC selectively changes a connection of a PPC from a first motor of the plurality of motors to a second motor of the plurality of motors, based on a change to the operating demands.

6. The vehicle of claim 1, wherein the environmental conditions include available traction at the respective ones of the plurality of wheels.

7. The vehicle of claim 1, further comprising a power supply coupled to the PMC.

8. The vehicle of claim 7, wherein the plurality of PPCs comprises a number of PPCs that, in total, at least meets the power output capacity of the power supply.

9. The vehicle of claim 1, wherein the PMC is further configured to:
   determine that a capacity of a first PPC of the plurality of PPCs would not be fully utilized if the first PPC is connected exclusively to a first motor of the plurality of motors; and
   alternately connect the first PPC with the first motor and with at least a second motor of the plurality of motors to distribute power from the first PPC to the first motor and to the second motor.

10. A system, comprising:
    a parallel modular converter (PMC) that includes:
       a plurality of parallel power converters (PPC); and
       a plurality of power outputs;
    wherein the PMC selectively connects individual PPCs of the plurality of PPCs to the power outputs based on load conditions of power sinks that are connected to the power outputs, and
    wherein the PMC is configured to selectively connect a first PPC of the plurality of PPCs to a first power sink of the plurality of power sinks and then to a second power sink in a repeating manner to distribute power from the first PPC to the first power sink and to the second power sink.

11. The system of claim 10, wherein the PMC includes a switching network connected to the plurality of PPCs and to the plurality of power outputs, wherein the switching network selectively connects different ones of the PPCs to the plurality of power outputs.

12. The system of claim 10, further comprising a controller configured to control the plurality of PPCs, wherein the controller synchronizes waveforms of power signals output by at least two PPCs of the plurality of PPCs.

13. The system of claim 10, wherein at least one of the plurality of PPCs is fixedly connected to one of the power outputs.

14. The system of claim 10, wherein the power sinks connected to the power outputs comprise electric motors.

15. The system of claim 14, wherein the electric motors are operatively connected to at least one of: a vehicle, an air conditioner unit, a hydraulic pump, a water pump, an elevator, a refrigeration module, and a blower unit.

16. The system of claim 10, further comprising a power supply coupled to the PMC.

17. The system of claim 16, wherein the plurality of PPCs comprises a number of PPCs that, in total, at least meets the power output capacity of the power supply.

18. A method, comprising:
   detecting load requests from a plurality of power sinks connected to a parallel modular converter (PMC) that includes a plurality of parallel power converters (PPC);
   selectively connecting individual PPCs of the plurality of PPCs to the power sinks to drive the power sinks, based on the load requests; and
   selectively connecting a first PPC of the plurality of PPCs to a first power sink of the plurality of power sinks and then to a second power sink in a repeating manner to distribute power from the first PPC to the first power sink and to the second power sink.

19. The method of claim 18, wherein the power sinks comprise electric motors.

20. The method of claim 18, wherein the load requests dynamically vary, and wherein selectively connecting the PPCs to the power sinks includes dynamically connecting the PPCs to the power sinks.

* * * * *

UNITED STATES PATENT AND TRADEMARK OFFICE
CERTIFICATE OF CORRECTION

PATENT NO. : 10,020,759 B2
APPLICATION NO. : 14/818024
DATED : July 10, 2018
INVENTOR(S) : Matthew J. Krolak et al.

It is certified that error appears in the above-identified patent and that said Letters Patent is hereby corrected as shown below:

In the Claims

In Column 16, Line 61, in Claim 12, delete "synchonizes" and insert -- synchronizes --, therefor.

Signed and Sealed this
Eleventh Day of December, 2018

Andrei Iancu
*Director of the United States Patent and Trademark Office*